July 16, 1963 R. KREMP ETAL 3,097,581
LIGHT METER ASSEMBLY
Filed March 15, 1960 4 Sheets-Sheet 1

INVENTORS
RUDOLF KREMP
BY FRIEDRICH BIEDERMANN
FERDINAND WAGNER
ALFRED KUBITZEK

July 16, 1963  R. KREMP ETAL  3,097,581
LIGHT METER ASSEMBLY
Filed March 15, 1960  4 Sheets-Sheet 4

INVENTORS
RUDOLF KREMP
FRIEDRICH BIEDERMANN
FERDINAND WAGNER
ALFRED KUBITZEK
BY
Michael S. Striker
Attorney United States Patent Office

3,097,581
Patented July 16, 1963

3,097,581
LIGHT METER ASSEMBLY
Rudolf Kremp and Ferdinand Wagner, Munich, Friedrich Biedermann, Unterhaching, near Munich, and Alfred Kubitzek, Gruenwald, near Munich, Germany, assignors to Agfa Aktiengesellschaft, Leverkusen-Bayerwerk, Germany
Filed Mar. 15, 1960, Ser. No. 15,149
Claims priority, application Germany Mar. 25, 1959
17 Claims. (Cl. 95—10)

The present invention relates to light meters.

More particularly, the present invention relates to light meters which are adapted to be used with cameras, particularly light meters which are permanently connected with and form part of a camera.

In light meters of this type it is conventional to render the pointer of the light meter visible through a window. In order to provide a relatively small window so as to conserve as much of the exterior space of the camera as possible, the window conventionally has such a size that the pointer of the light meter is rendered visible through only a fraction of the entire range of movement of the pointer. As a result, there is a serious drawback in conventional cameras of this type, in that the user cannot detect when the pointer is at the end of its range of movement or even in the region of an end of its range of movement. Thus, the light meter will indicate light values between a certain minimum and maximum light intensity, and the pointer will move through a very definite range of movement between these minimum and maximum values. When the pointer is at either end of its range of movement the user of a conventional camera who is unaware of this fact may continue to operate the camera in the belief that the camera is being properly set, whereas in fact the pointer cannot move further and is thus indicating a false light intensity.

One of the objects of the present invention is to overcome this drawback by providing a light meter assembly which will indicate to the operator when the pointer of the light meter is in the region of one or the other of the ends of its range of movement.

Another object of the present invention is to provide a light meter assembly which will not only indicate when the pointer is in the region of the ends of its range of movement but which will also retain the small window which renders the pointer visible through only a fraction of its range of movement.

A further object of the present invention is to provide an exceedingly simple structure which will indicate when the pointer of the light meter has reached the region of both of the ends of its range of movement.

An additional object of the present invention is to provide a single indicator indicating when the pointer has reached either of the ends of its range of movement.

Still another object of the invention is to provide a light meter assembly which will render at least part of the light meter pointer visible while also indicating when it has reached the end of its range of movement.

The objects of the invention also include the provision of a structure which will cooperate with the light meter assembly to take into account the factor of the speed of the film which is used in the camera.

With the above objects in view the invention includes, in a light meter assembly which is adapted to be used with cameras or the like, a support means and a rotary light measuring means supported for rotary movement by the support means. This light measuring means includes a pointer which is turnable through a given range. A means is provided for rendering the pointer visible through only a fraction of its range of movement. In accordance with the invention there is provided an indicator means which cooperates with the light measuring means for indicating when the pointer is in the region of at least one of the ends of its range of movement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
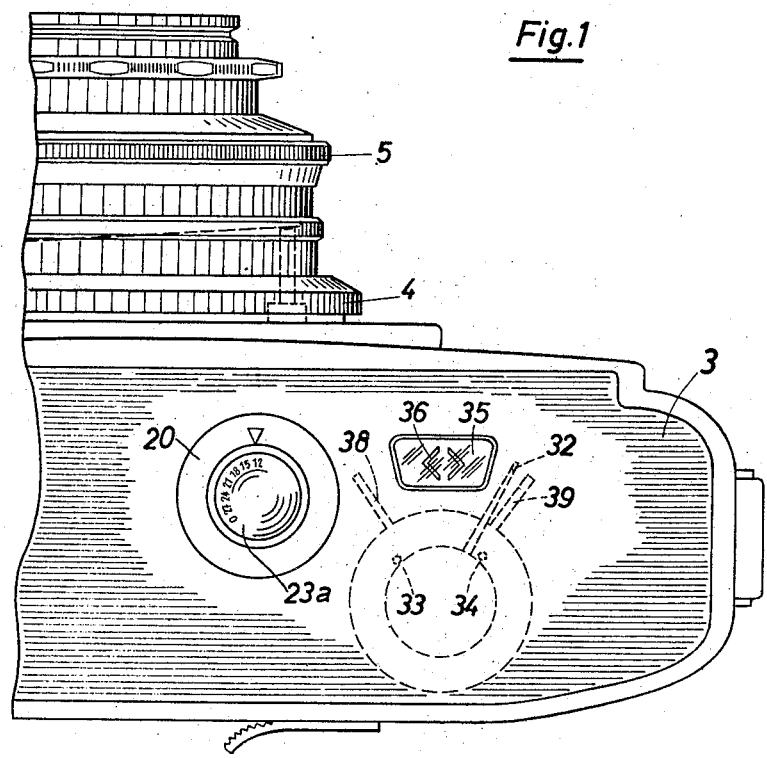
FIG. 1 is a fragmentary top plan view of a camera which includes the light meter assembly of the invention.
Figure 2:
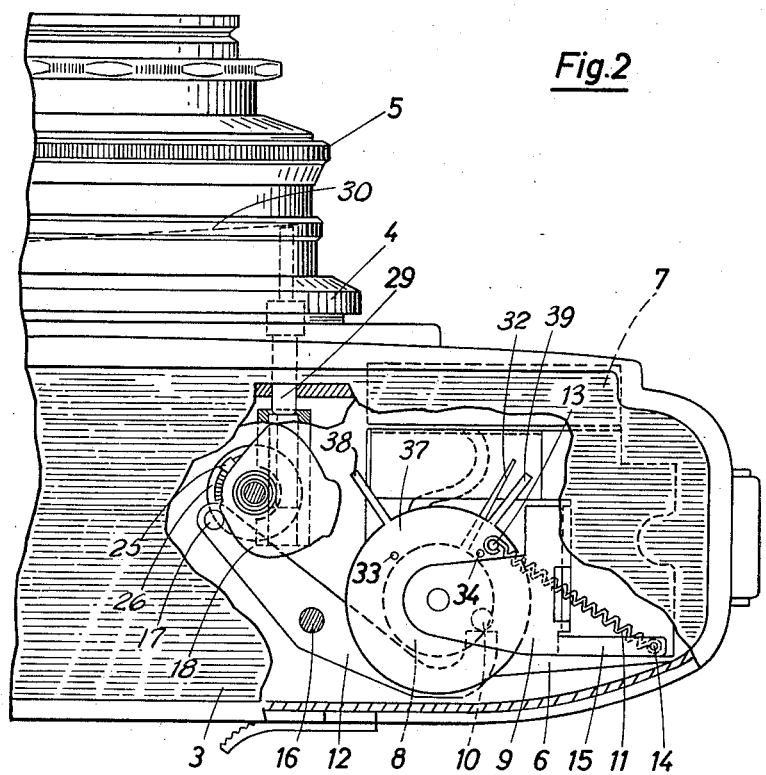
FIG. 2 shows the structure of FIG. 1 with the upper wall of the camera broken away to show the parts therebeneath.
Figure 3:
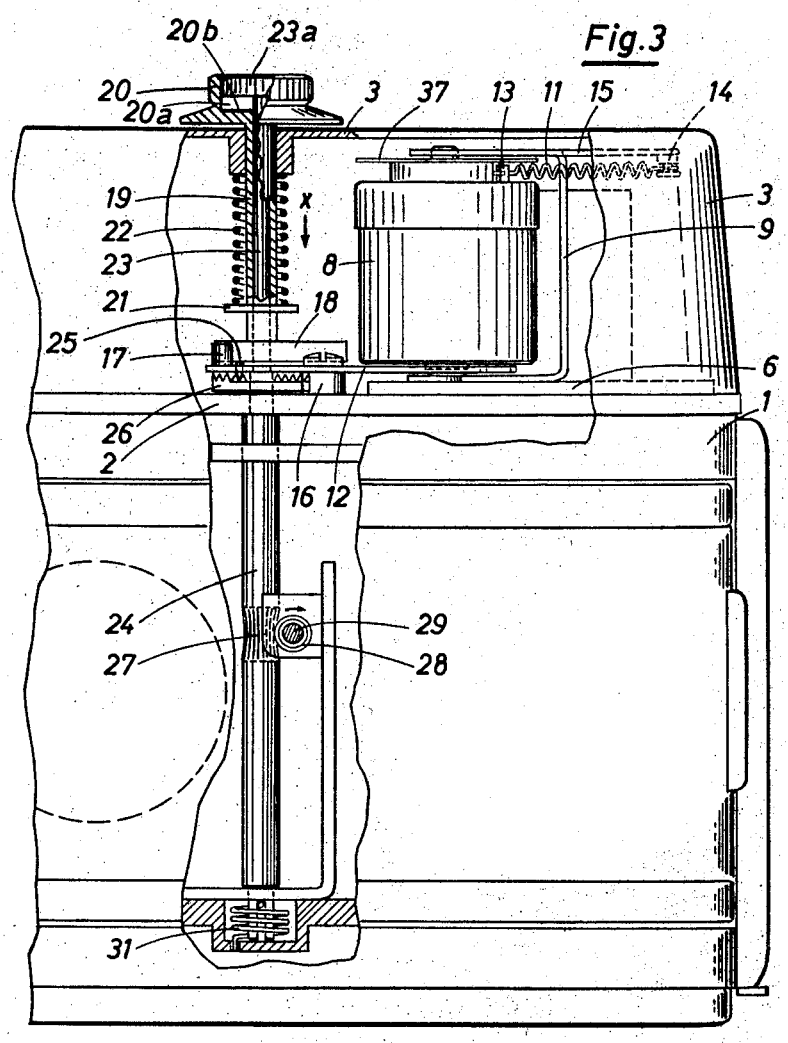
FIG. 3 is a fragmentary rear elevation of the camera of FIGS. 1 and 2, with the rear wall broken away to show the camera structure which cooperates with the light meter assembly.

Referring now to FIGS. 1–3, there is illustrated therein a camera housing 1 which terminates at its top end in a top wall 2 of the camera housing (FIG. 3). The top wall 2 carries a hollow cap member 3 which serves to house on the top wall 2 such camera units as the viewfinder, range finder, and the like. Also there is housed within this cap 3 the light meter assembly of the invention. As may be seen from FIGS. 1 and 2, the camera carries a diaphragm adjusting ring 4 which is turned by the operator in order to set the size of the exposure aperture, and also there is an exposure time setting ring 5 which is turned by the operator to set the exposure time in a purely conventional manner.

The upper wall 2 of the camera housing carries a support means for part of the light meter assembly of the invention, and this support means is in the form of a plate 6 which is fixed to the top wall 2 and which has a plurality of upstanding lugs and the like for supporting the various components of the light meter assembly. These components include the ptotoelectric cell 7 which is purely conventional and which has an exposed honeycomb window at the front wall of the camera so that the light can reach the photocell 7. This photocell 7 is connected electrically with a light measuring means in the form of a rotary instrument 8 which is supported by the support means 6 for rotary movement about an axis perpendicular to the optical axis of the camera. The turning axis of the instrument 8 coincides with its own axis. Thus, this instrument 8 includes an exterior substantially cylindrical housing shown most clearly in FIG. 3, and within this housing is located a galvanometer rotor which will turn with respect to the housing 8 according to the light intensity which is sensed by the photocell 7, this cooperation between a photocell and galvanometer being conventional in many light meters. The support means 6 includes a bracket 9 which is integral with the support means 6 and which extends over the instrument 8 so as to support the latter for free rotary movement about its axis. To the underside of the cylindrical exterior housing of the instrument 8 is fixed a pin 10 which extends parallel to the axis of turning of the light measuring means 8, and a spring 11 serves to urge the instrument to turn in a clockwise direction, as viewed in FIG. 2, so as to maintain the pin 10 in engagement with the right free end of a lever 12, as viewed in FIG. 2, this lever 12 extending beneath the rotary light measuring means 8. The coil spring 11 is connected at one end to a pin 13 fixed to the top of the exterior housing of the light measuring means 8, and at its opposite end the spring 11 is connected to a pin 14 which is fixedly carried by an arm 15 which is integral with and extends from the bracket 9.

The lever 12 is supported intermediate its ends for rotary movement by a pivot pin 16 which is stationary and carried by the top wall of the camera housing 1, and at its end which is distant from the light measuring means 8 the lever 12 carries a pin 17 which extends parallel to the turning axis of the lever 12. At its end portion which carries the pin 17, the lever 12 extends beneath a rotary cam 18, and the pin 17 is maintained in engagement with the camming periphery of the cam 18 by the action of the spring 11 which urges the light measuring means 8 to turn in a clockwise direction, as viewed in FIG. 2, so that the pin 10 tends to turn the lever 12 in a clockwise direction and thus maintains the pin 17 in engagement with the camming edge of the cam 18.

As is shown most clearly in FIG. 3, the cam 18 is fixedly connected with an upwardly extending sleeve member 19 which has a solid portion extending through the upper wall of the cap 3 and slidably guided by a tubular portion of this upper wall, as is evident from FIG. 3, and at the exterior of the cap 3 the sleeve 19 is rigidly fixed with a knob 20 which is available to the operator for the purpose of setting into the camera the factor of the speed of the film which is used in the camera. Adjacent to the cam 18 the sleeve 19 fixedly carries an outwardly directed annular flange 21, and a coil spring 22 is coiled around the sleeve 19, presses with its bottom end against the flange 21, and with its top end against the underside of the guide sleeve of the cap 3 through which the sleeve 19 slidably extends. Thus, this spring 22 urges the sleeve 19, the knob 20, and the cam 18 in the direction of the arrow x, indicated in FIG. 3.

The sleeve 19 is hollow and has open ends, and a reduced end portion 23 of a rotary shaft 24 extends slidably through the sleeve 19. On the upper end of the portion 23 is provided a disk 23a, which projects in a bore 20a of the knob 20. The shaft 24 is guided by suitable bearings of the camera 1 for rotary movement. In order to provide an adjustable connection between the shaft 24 and the cam 18 the latter fixedly carries a downwardly directed pointed tooth 25, and this tooth 25 cooperates with the upwardly directed teeth of a ring gear 26 which is fixed to the shaft 24 for rotary movement therewith. The shaft 24 includes within the camera 1 a series of teeth 27 distributed around the axis of the shaft 24 and acting as a pinion. These teeth 27 mesh with the teeth 28 of an axially movable, known rack 29 which extends parallel to the optical axis and which has its front end at all times in engagement with a cam 30. This cam 30 will always be moved in a well known way to positions which are determined by the settings of the rings 4 and 5, so that the cam 30 maintains the rack 29 in an axial position which is indicative of the combination of exposure time and exposure aperture set into the camera by the rings 5 and 4, respectively. As is shown at the bottom of FIG. 3, a spring 31 is coiled around the lower end of the shaft 24, has one end fixed to the camera housing 1 and has its opposite end located in a slot of the shaft 24, and this spring 31 urges the shaft 24 to turn in a counter clockwise direction, as viewed in FIG. 2, so as to serve to maintain the front end of rack 29 in engagement with the cam 30 at all times. In this way the angular position of the cam 18 will also be determined by the combination of exposure time and exposure aperture set into the camera by the operator, as long as the tooth 25 is in engagement with the teeth of the gear 26.

The light measuring means 8 includes a pointer 32 which extends through a suitable horizontal slot formed in the exterior cylindrical housing of the light measuring means 8. This pointer is connected to the rotor of the galvanometer to turn therewith, and thus the pointer 32 will always assume with respect to the exterior housing of the instrument 8 an angular position indicative of the intensity of the light reaching the photocell 7. This pointer 32 is turnable through a predetermined, given range, and this range is determined by the pair of pins 33 and 34 which are situated in the path of turning of the pointer 32 so as to limit the range of turning thereof.

The light meter assembly includes a means for rendering the pointer 32 visible during only a fraction of its given range of turning, and this means for rendering the pointer 32 visible includes a window 35 carried by the top wall of the cap 3 in a suitable opening thereof. This window 35 is made of any transparent material and carries an index 36 which can be cut into the material of the window 35 or which can be printed thereon in any suitable color at the underside of the window. As is apparent from FIG. 1, the index 36 is in the form of a pair of V's which are directed away from each other so that when the pointer 32 is located between the pair of horizontal V's the operator knows that the pointer 32 is properly aligned with the index 36.

The light meter assembly of the invention further includes the means for indicating when the pointer 32 is in the region of the ends of its range of movement, and this means in the embodiment of FIGS. 1–3 includes a pair of indicators 38 and 39 which are integral and project radially from a circular plate 37 which is rigidly fixed with the rotary light measuring means 8 so that the plate 37 together with its projection 38 and 39 turn with the light measuring means 8. It will be noted from FIGS. 1 and 2 that the indicators 38 and 39 project from the housing of the light measuring means 8 by a distance slightly less than the pointer 32, and also each of the indicators 38 and 39 is wider than the pointer 32. With this construction when the pointer 32 engages the pin 33 all except the outer tip of the pointer 32 will be covered by the indicator 38, while when the pointer engages the pin 34 all except the outer tip of the pointer will be covered by the indicator 39.

Inasmuch as the support means 6 carries the light measuring means 8 as well as the photocell 7 and in addition the indicator means formed by the plate 37 and the projections 38 and 39, all of this structure forms a unitary assembly which is adapted to be attached as a unit to the camera.

When the camera is used it is directed toward the subject so that the available light will reach the photocell 7 and cause the light measuring means 8 to operate so that the pointer 32 arrives at a position indicative of the intensity of the light. Now the operator turns the diaphragm setting the ring 4 and the exposure time setting ring 5, and in this way the control cam 30 is turned so that the rack 29 is axially moved. Any suitable bearings such as that shown in FIG. 3 are provided for guiding the rack 29, which is also guided by an opening in a wall which is shown in section in FIG. 2. As a result of the cooperation between the teeth of the rack 29 and the teeth 27 of the shaft 24, this latter shaft is turned and turns the gear 26 which through meshing with the tooth 25 causes the cam 18 to turn. This turning of the cam 18 results in turning of the lever 12 and thus in turning of the entire light measuring means 8, and the operator sets the rings 4 and 5 in such a way that the pointer 32 is aligned with the index 36. When this alignment is obtained the operator knows that the camera has been set with one of the many combinations of exposure time and exposure aperture suitable for the particular lighting conditions.

When there is not much light available, the pointer 32 will be in the immediate vicinity of the indicator 38. Under these lighting conditions when the pointer 32 is aligned with the index 36, the indicator 38 will also be rendered visible by the window 35 beneath which the indicator 38 will also move at this time, so that the operator will know when the indicator 38 is seen that the end of the range of turning of the pointer will be reached shortly.

If there is slightly less light available then the pointer 32 will reach the lower end of its range of movement and will engage the pin 33 so as to move directly beneath and be covered by the indicator 38, except for the outer tip of the pointer which extends beyond the indicator 38. When the operator sees that the pointer 32, except for its outer tip, is covered by the indicator 38 the operator knows that the pointer has reached one of the ends of its range of turning and the operator will also know that even if the rings 4 and 5 are turned so as to align the pointer 32 which is now covered by the indicator 38 with the index 36, the camera will not be properly set for the available light and an improper exposure will be made inasmuch as the pointer 32 has reached one of the ends of its range of turning and can no longer give an indication of the light intensity. Because the outer tip of the pointer 32 is still visible beyond the indicator 38 the operator, particularly an inexperienced operator, will still be able to see where the pointer 32 is located.

The same operations take place when there is such a high light intensity that the pointer 32 reaches the other end of its range of turning. Thus, when the pointer 32 is in engagement with the pin 34 and covered, except for its outer tip, by the indicator 39 the operator will also know that the aligning of the indicator 39 and the pointer 32 therebeneath with the index 36 will not provide for a proper exposure.

In order to set the factor of the speed of the particular film used in the camera into the light meter assembly the operator raises the knob 20 in opposition to the spring 22 as far as the bottom 20b of the bore 20a of the knob 20 join the disk 23a and limits the upward movement of the knob 20 and the cam 18 therewith. The operator then turns the knob 20 until an index thereon is aligned with the proper film speed graduation located on the top wall of the disk 23. This turning of the knob 20 while it is raised in this way causes a turning of the cam 18 independently of the shaft 24 since the tooth 25 is now out of engagement with the teeth of the gear 26, and in this way the lever 12 is turned so as to turn the instrument 8 and thus alter the position of the pointer 32 with respect to the index 36 by an angle which will introduce the factor of film speed into the light meter assembly. Upon release of the knob 20 the spring 22 returns the parts to the position shown in FIG. 3 where the tooth 25 again meshes with the teeth of the gear 26.

Figure 4:
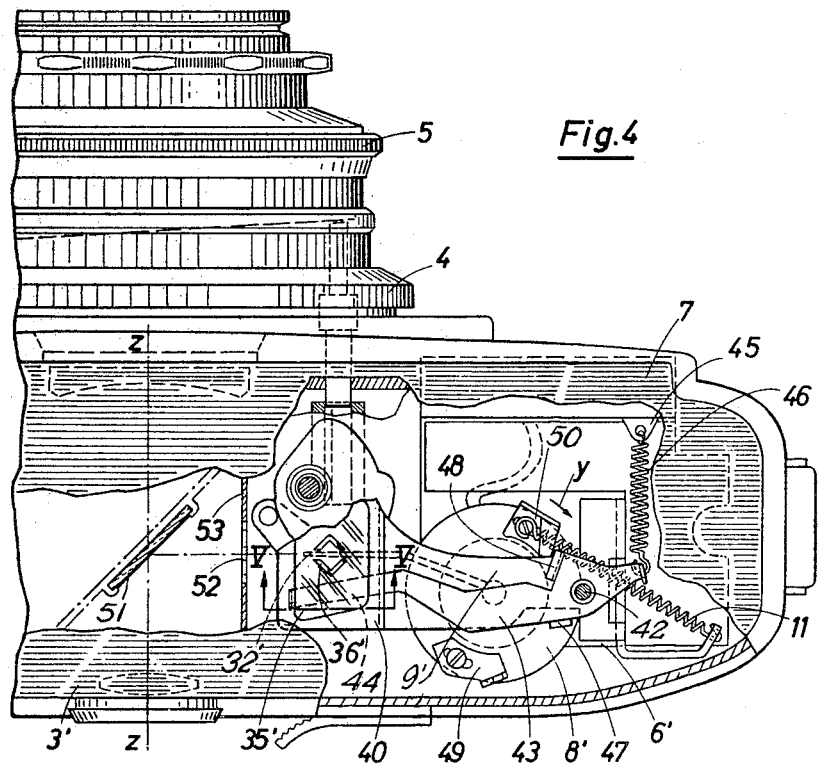
FIG. 4 is a fragmentary top plan view of a camera which includes another embodiment of a light meter assembly according to the invention, the top wall of the camera of FIG. 4 being broken away to clearly illustrate the structure therebeneath.
Figure 5:
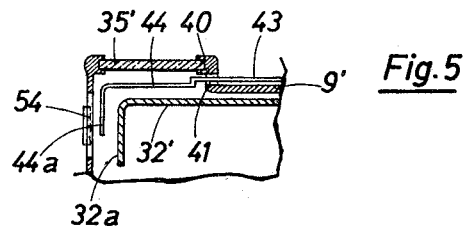
FIG. 5 is a fragmentary sectional elevation taken along line V—V of FIG. 4 in the direction of the arrows.

According to the embodiment of the invention which is illustrated in FIG. 4, the support means 6' which serves the same function as the support means 6 and is of the same general construction also carries the photocell 7 and includes a bracket 9' which serves to support the light measuring means 8' for rotary movement. The upper wall of the bracket 9' is extended and is provided with a portion 40 which carries the window 35' in an upper opening of the portion 40, this window 35' being provided with the index 36' and being located beneath an opening in the top wall of the cap 3', so that in this way light will be able to reach the window 35' and the window 35' will be visible to the operator. The portion 40 of the bracket 9' has at its left end, as viewed in FIG. 5, a connection with a vertical partition 53 which extends across the interior of the cap 3' parallel to the optical axis, and this partition 53 is provided near its top end with an opening which carries a window 52 provided with an index 54 which extends vertically. The index 54 is located in the same vertical plane as the central portion of the index 36', this vertical plane being perpendicular to the optical axis Z—Z of the viewfinder indicated in FIG. 4. The extension 40 of the bracket 9' is formed with a horizontal slot 41. The bracket 9' carries a stationary pivot pin 42 on which a lever portion 43 of an end-of-range indicator 44 is turnably supported, this lever 43 extending freely through the slot 41 and having the indicating portion of the indicator 44 fixed to its free end, as indicated in FIG. 5. This indicator 44 is made of a translucent material of such a color that it will be immediately easily visible to the user. The end of the lever portion 43 of the indicator 44 which is distant from the indicator portion 44 is connected to one end of a spring 46 whose opposite end is connected to a lug 45 of the support means 6, so that the spring 46 urges the indicator means 44 to turn in a counter clockwise direction, as viewed in FIG. 4, to a rest position where the left free end of lever portion 43 of the indicator means 44 engages an end of the slot 41, and in this position the indicator portion 44 will be located in the vicinity of one end of the window 35' spaced from the index 36'. The lever portion 43 of the indicator means 44 has a pair of integral lugs 48 and 47 extending therefrom, and the lugs 47 and 48 are respectively located in the paths of turning movement of the moving members 49 and 50, respectively, which are fixedly carried by the outer housing of the light measuring means 8' at an upper wall of the latter. As is evident from FIG. 4, the moving members 49 and 50 are in the form of angle members which are formed with slots through which a pair of screws respectively extend into threaded engagement with the instrument 8' so as to fix the moving members 49 and 50 thereto for rotary turning movement therewith, and because of these slots it is possible to adjust the positions of the moving members 49 and 50 with respect to the light measuring means 8' which carries the same. The housing of the light measuring means 8' is urged by a spring 11 to turn in a clockwise direction, as viewed in FIG. 4, in the same way that the spring 11 of FIG. 2 acts on the instrument 8 illustrated therein, and the light measuring means 8' cooperates in the same way as the embodiment of FIGS. 1–3 with the lever 12, the cam 18, and the transmission from the rings 4 and 5, so that this light measuring means 8' will be turned in the manner described above when setting the camera to make an exposure.

When the rings 4 and 5 are turned so as to align the pointer 32' of the embodiment of FIGS. 4 and 5 with the index 36', this portion of the pointer 32' which is rendered visible by the window 35' will extend perpendicularly to the optical axis Z—Z of the viewfinder. This viewfinder includes a semi-transparent reflector 51 which extends at a 45 degree angle across the optical axis Z—Z of the viewfinder, and the indicator portions 32a and 44a will have images thereof as well as of the index 54 reflected by element 51 along the optical axis of the viewfinder, so that when looking through the viewfinder the user will also see images of the indicator portions 32a and 44a which are in the form of downwardly directed free ends of the pointer 32' and the indicator means 44, respectively, as is particularly evident from FIG. 5. Thus, the operator will see images of the index 54, the indicator portion 44a, and the pointer portion 32a sueprimposed on the image of the subject which is seen through the viewfinder.

Thus, when the operator sets the rings 4 and 5 of the embodiment of FIG. 4, the setting will be continued until the operator sees either the horizontal portion of the pointer 32' aligned with the index 36' or the image of the pointer portion 32a aligned with the image of the index 54 in the field of the viewfinder. Thus the operator has the option of setting the camera either while looking down on the top wall thereof or while viewing the subject.

If there is insufficient light for making a proper exposure then the setting of the rings 4 and 5 will cause the light measuring means 8' to turn in the direction of the arrow y of FIG. 4, and because the end of the range of turning of the pointer 32' in one direction has been reached the extent to which the instrument 8' is turned will be great enough to cause the moving member 50 to engage the lug 48 and turn the lever portion 43 of the indicator means 44 also in the direction of the arrow y, and the indicator portion of the indicator means 44 will move over and cover the pointer 32'. The lever arm through which the moving member 50 acts on the lever 43 is so small with respect to the lever arm of the lever portion 43 which acts on the indicator portion located directly beneath the window 35', that when either of the rings 4 or 5 is turned through an angle which corresponds to the distance of one graduation of a scale of light values which is not illustrated in the drawings, the indicator portion of the indicator means 44 will turn from one end of the window 35' all the way up to its position of alignment with the index 36', so that the indicator means 44 will become visible in the region of the index 36' only during the very last phase of movement of the pointer 32' in the region of one of the ends of its range of turning. When the operator sees that the pointer 32' is covered either in the window 35' or in the viewfinder then the operator knows that the light meter assembly cannot be relied upon for giving proper settings of the camera.

By making the indicator portion 44 of the indicator means 44 of a translucent, colored material the indicator means itself will be easily and immediately visible to the operator and at the same time the position of the pointer 32' will also be readily perceived.

Where there is too much light to enable the light meter assembly to give a proper setting of the camera, the rotary light measuring means 8' is turned in a counterclockwise direction, as viewed in FIG. 4, and if the amount of light is so great that the pointer 32' reaches the opposite end of its range of turning then the moving member 49 will engage the lug 47 and again turn the lever portion 43 in a clockwise direction, as viewed in FIG. 4, which is to say in the direction of the arrow y, so that in this case also the indicator means 44 will indicate that the pointer 32' has reached an end of its range of movement and cannot be relied upon to provide an accurate setting of the camera, and of course at either end of its range of movement the portions 32a and 44a are projected into the field of the viewfinder so as to have their images visible to the operator, or the horizontal left end portion thereof, as viewed in FIG. 5, are visible through the window 35' which is located beneath an opening in the top wall of the camera.

It will be understood that each of the elements described above, or two or more together, may also find a useful application in other types of light meters differing from the types described above.

While the invention has been illustrated and described as embodied in light meters for cameras or the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various application without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A light meter assembly adapted to be used with cameras and the like, comprising, in combination, rotary light measuring means including a rotary pointer turnable through a given range; means cooperating with said pointer for rendering at least part thereof visible through a fraction of said range of movement thereof, said means for rendering said pointer visible including a stationary index with which said pointer is aligned during use of the light meter assembly; and indicating means moved by said light measuring means for indicating when said pointer is in the region of at least one end of said range.

2. A light meter assembly adapted to be used with cameras and the like, comprising, in combination, rotary light measuring means including a rotary pointer turnable through a given range; means cooperating with said pointer for rendering at least part thereof visible through a fraction of said range of movement thereof, said means for rendering said pointer visible including a stationary index with which said pointer is aligned during use of the light meter assembly; indicating means moved by said light measuring means for indicating when said pointer is in the region of at least one end of said range; support means supporting said light measuring means for rotary movement, and said indicating means being fixed to said light measuring means for rotary movement therewith.

3. A light meter assembly adapted to be used with cameras and the like, comprising, in combination, rotary light measuring means including a rotary pointer turnable through a given range; means cooperating with said pointer for rendering at least part thereof visible through a fraction of said range of movement thereof, said means for rendering said pointer visible including an index with which said pointer is aligned during use of the light meter assembly; and indicator means moved by said light measuring means for indicating when said pointer is in the region of either end of said range.

4. A light meter assembly adapted to be used with cameras and the like, comprising, in combination, light measuring means including a rotary pointer turnable through a given range; means cooperating with said pointer for rendering at least part thereof visible through a fraction of said range of movement thereof, said means for rendering said pointer visible including an index with which said pointer is aligned during use of the light meter assembly; indicating means cooperating with said light measuring means for indicating when said pointer is in the region of at least one end of said range; support means supporting said light measuring means for rotary movement and also supporting said indicator means for rotary movement independently of said light measuring means; and control means carried by said light measuring means and cooperating with said indicator means for controlling the position of the latter.

5. A light meter assembly adapted to be used with cameras and the like, comprising, in combination, light measuring means including a rotary pointer turnable through a given range; means cooperating with said pointer for rendering at least part thereof visible through a fraction of said range of movement thereof, said means for rendering said pointer visible including an index with which said pointer is aligned during use of the light meter assembly; indicating means cooperating with said light measuring means for indicating when said pointer is in the region of at least one end of said range; support means supporting said light measuring means for rotary movement and also supporting said indicator means for rotary movement independently of said light measuring means; and control means carried by said light measuring means and cooperating with said indicator means for controlling the position of the latter, said control means including at least one moving member fixedly carried by said rotary light measuring means and turnable with the latter along a path intersected by said indicator means so that when said light measuring means moves through a predetermined angle said moving member will engage and turn said indicator means.

6. A light meter assembly adapted to be used with cameras and the like, comprising, in combination, light measuring means including a rotary pointer turnable through a given range; means cooperating with said pointer for rendering at least part thereof visible through a fraction of said range of movement thereof, said means for rendering said pointer visible including an index with which said pointer is aligned during use of the light meter assembly; indicating means cooperating with said light measuring means for indicating when said pointer is in the region of at least one end of said range; support means supporting said light measuring means for rotary movement and also supporting said indicator means for rotary movement independently of said light measuring means; control means carried by said light measuring means and cooperating with said indicator means for controlling the position of the latter, said control means including at least one moving member fixedly carried by said rotary light measuring means and turnable with the latter along a path intersected by said indicator means so that when said light measuring means moves through a predetermined angle said moving member will engage and turn said indicator means; and means adjustably connecting said moving member to said light measuring means.

7. In a light meter assembly adapted to be used with cameras and the like, in combination, support means; light measuring means supported for rotary movement by said support means and including a pointer turnable through a given range; means cooperating with said pointer for rendering the latter visible through only a fraction of said range, said means for rendering said pointer visible including an index with which said pointer is aligned during use of the light meter assembly; an end-of-range indicator also supported for rotary movement by said support means and also being capable of being rendered visible by said means for rendering said pointer visible, said indicator extending across said light measuring means; and a pair of moving members fixedly carried by said light measuring means for rotary movement therewith and respectively located on opposite sides of said indicator for respectively engaging and moving the latter when said pointer is in the region of one or the other of ends of said range of movement thereof, said moving members cooperating with said pointer to turn the latter to a position where it is rendered visible by said means for rendering said pointer visible when the latter is in the region of one or the other of its range ends.

8. In a light meter assembly, in combination, support means; light measuring means supported for rotary movement by said support means and including a pointer turnable through a given range; means cooperating with said pointer for rendering the latter visible through only a fraction of said range, said latter means including an index with which said pointer is aligned during use of the light meter assembly; an indicator also supported for rotary movement by said support means, said indicator extending across said light measuring means and being turnable to a position where said means for rendering said pointer visible also renders said indicator visible, said indicator having a rest position beyond the range of visibility provided by said means for rendering said pointer visible so that when said indicator is in said rest position thereof it is not visible; and at least one moving member carried by said rotary light measuring means and engaging and turning said indicator to said position where it becomes visible when said pointer is in the region of one of the ends of said range of movement thereof, so that said indicator will indicate to the operator that the pointer is in the region of one of the ends of its range of movement.

9. In a light meter assembly, in combination, support means; light measuring means supported for rotary movement by said support means and including a pointer turnable through a given range; means cooperating with said pointer for rendering the latter visible through only a fraction of said range, the latter means including an index with which said pointer is aligned during use of the light meter assembly; a single end-of-range indicator also supported for rotary movement by said support means; and control means connected to said light measuring means and cooperating with said indicator for moving the latter to a position where it will indicate that said pointer is in the region of the ends of said range whenever the pointer reaches one or the other of the ends of said range.

10. In a light meter assembly, in combination, support means; rotary light measuring means supported for rotary movement by said support means and including a pointer turnable through a given range; means cooperating with said pointer for rendering the latter visible through only a fraction of said range and including an index with which said pointer is aligned during use of said light meter assembly; an end-of-range indicator extending across said light measuring means and also supported for rotary movement by said support means, said end-of-range indicator including a two-armed lever portion which carries the indicating portion of said indicator, said means for rendering said pointer visible rendering said indicator portion of said end-of-range indicator visible when said pointer is in the region of the ends of its range of movement; and a pair of moving members carried by said rotary light measuring means and respectively located in opposite sides of said indicator for turning the latter to a position where it indicates that said pointer is in the region of the end of its range of movement, said moving members respectively cooperating with said lever portion of said indicator at an arm thereof which is shorter than the arm of said lever portion which turns said indicating portion of said indicator.

11. In a light meter assembly, in combination, support means; rotary light measuring means supported for rotary movement by said support means and including a pointer turnable through a given range; means cooperating with said pointer for rendering the latter visible through only a fraction of said range and including an index with which said pointer is aligned during use of said light meter assembly; an end-of-range indicator extending across said light measuring means and also supported for rotary movement by said support means, said end-of-range indicator including a two-armed lever portion which carries the indicating portion of said indicator, said means for rendering said pointer visible rendering said indicator portion of said end-of-range indicator visible when said pointer is in the region of the ends of its range of movement; and a pair of moving members carried by said rotary light measuring means and respectively located in opposite sides of said indicator for turning the latter to a position where it indicates that said pointer is in the region of the end of its range of movement, said moving members respectively cooperating with said lever portion of said indicator at an arm thereof which is shorter than the arm of said lever portion which turns said indicating portion of said indicator, the lever arm cooperating with said moving members having with respect to the lever arm cooperating with said indicator portion a fractional value which will produce a movement of said indicator portion into the field of vision afforded by said means for rendering said pointer visible up to said index only when said light measuring means is in an angular position corresponding to the location of said pointer in the immediate vicinity of an end of its range of movement.

12. In a camera, in combination, rotary light measuring means including a pointer turnable through a given range, said pointer having a pair of portions; indicator means cooperating with said light measuring means for indicating when said pointer is in the region of the ends of said range, said indicator means also having a pair of portions; and means cooperatng with all of said portions for rendering one of said portions of said pointer and one of said portions of said indicator means visible in a viewfinder of the camera and for rendering the other of said portions of said pointer and the other of said portions of said indicator means visible at a different part of the camera.

13. In a light meter assembly adapted to be used with cameras and the like, in combination, support means; rotary light measuring means supported for rotary movement by said support means and including a pointer turnable through a given range; means for rendering said pointer visible through only a fraction of said range, said means for rendering said pointer visible including an index with which said pointer is aligned during use of the light meter assembly; and indicator means cooperating with said light measuring means for indicating when said pointer is in the region of at least one of the ends of said range, said indicator means being in the vicinity of said index and being rendered visible by said means for rendering said pointer visible when said pointer is in the region of one of the ends of said range, and said indicator means at least partly overlapping said pointer when the latter is in the region of one of the ends of said range.

14. In a light meter assembly adapted to be used with cameras and the like, in combination, support means; rotary light measuring means supported for rotary movement by said support means and including a pointer turnable through a given range; means for rendering said pointer visible through only a fraction of said range, said means for rendering said pointer visible including an index with which said pointer is aligned during use of the light meter assembly; and indicator means cooperating with said light measuring means for indicating when said pointer is in the regon of at least one of the ends of said range, said indicator means being in the vicinity of said index and being rendered visible by said means for rendering said pointer visible when said pointer is in the region of one of the ends of said range, and said indicator means at least partly overlapping said pointer when the latter is in the region of one of the ends of said range, said indicator means being translucent and having a color which renders said indicator means easily visible.

15. In a light meter assembly as recited in claim 1 and wherein said indicating means is moved by said light measuring means for indicating when said pointer is in the region of both ends of said range, said indicating means including a plate carried by said light measuring means for rotary movement therewith, said plate having a pair of projections extending radially with respect to the axis of said light measuring means and respectively overlapping said pointer when the latter is at the ends of said range, respectively, so that when the pointer is at the ends of said range of movement thereof said projections of said plate will be respectively rendered visible by said means which renders said pointer visible.

16. In a light meter assembly as recited in claim 15, said projections of said plate respectively being wider than said pointer.

17. In a light meter assembly, in combination, support means; a light measuring arrangement including moveable means movably supported by said support means, a pointer movable relative to said movable means through a given range, the position of said pointer being determined by the intensity of the measured light, and limiting means carried by said movable means and preventing movement of said pointer beyond at least one end of said given range, so that when said pointer is at said one end of said given range its position does not accurately indicate the intensity of the measured light; means for moving said light measuring arrangement relative to said support means into a selected position locating said pointer at a predetermined position relative to said support means; and indicating means moved by said light measuring arrangement into said predetermined position relative to said support means when said pointer is at said one end of said given range for indicating that said pointer does not accurately indicate the intensity of the measured light.

References Cited in the file of this patent

UNITED STATES PATENTS

| | | |
|---|---|---|
| 2,058,532 | Tuttle | Oct. 27, 1936 |
| 2,222,292 | Gorlich | Nov. 19, 1940 |
| 2,242,043 | Sanger | May 13, 1941 |
| 2,250,898 | Tonnies | July 29, 1941 |
| 2,305,294 | Kuppenbender | Dec. 15, 1942 |
| 2,887,026 | Rentschler | May 19, 1959 |
| 2,920,542 | Engelsmann | Jan. 12, 1960 |
| 2,928,323 | Steisslinger | Mar. 15, 1960 |
| 2,932,242 | Greger | Apr. 12, 1960 |